(12) United States Patent
Panda

(10) Patent No.: US 11,107,014 B2
(45) Date of Patent: Aug. 31, 2021

(54) METHOD AND SYSTEM FOR MODEL FITTING TO HIERARCHICAL TIME SERIES CLUSTER

(71) Applicant: Tata Consultancy Services Limited, Mumbai (IN)

(72) Inventor: Prasanta Kumar Panda, Bhubaneswar (IN)

(73) Assignee: Tata Consultancy Services Limited, Mumbai (IN)

( * ) Notice: Subject to any disclaimer, the term of this patent is extended or adjusted under 35 U.S.C. 154(b) by 499 days.

(21) Appl. No.: 16/059,889

(22) Filed: Aug. 9, 2018

(65) Prior Publication Data
US 2019/0050763 A1   Feb. 14, 2019

(30) Foreign Application Priority Data

Aug. 10, 2017   (IN) .............................. 201721028534

(51) Int. Cl.
*G06Q 10/04*   (2012.01)
*G06F 17/18*   (2006.01)
(Continued)

(52) U.S. Cl.
CPC ............. *G06Q 10/04* (2013.01); *G06F 17/18* (2013.01); *G06K 9/6215* (2013.01);
(Continued)

(58) Field of Classification Search
CPC .......... G06F 17/17; G06F 17/00; G06F 17/10; G06F 17/15; G06F 17/16; G06Q 10/04; G06Q 10/08; G06Q 50/06; G08G 1/0125; G08G 1/0129; G06K 9/6219; G06N 7/00; G06N 20/00; G06N 99/00
See application file for complete search history.

(56) References Cited

U.S. PATENT DOCUMENTS 6,928,398 B1   8/2005   Fang et al.
2015/0120269 A1   4/2015   Dannecker et al.
(Continued)

OTHER PUBLICATIONS

Zhang, Xiaohang, Jiaqi Liu, Yu Du, and Tingjie Lv. "A novel clustering method on time series data." (Elsevier Ltd., 2011) Expert Systems with Applications 38, No. 9. pp. 11891-11900. doi:10.1016/j.eswa.2011.03.081 (Year: 2011).*
(Continued)

*Primary Examiner* — Rehana Perveen
*Assistant Examiner* — Daniel E Miller
(74) *Attorney, Agent, or Firm* — Finnegan, Henderson, Farabow, Garrett & Dunner LLP

(57) ABSTRACT

Method and system for model fitting to hierarchical time series clusters is described. A plurality of time series to be analyzed are clustered as hierarchical time series clusters using Dynamic Time Warping (DTW) as the optimal distance measure to create time series hierarchical clusters. The method disclosed recognizes least dissimilarity time series in the hierarchical time series clusters, and a best fit model is identified for the time series. The same model is continued up the hierarchy along the branch of the hierarchical time series clusters till the model identified satisfies Error Tolerance (ET) and Error Difference (ED) criteria. The method reduces the model fitting time or model building time by more than 50%.

12 Claims, 9 Drawing Sheets

(51) Int. Cl.
*G06K 9/62* (2006.01)
*G06N 3/02* (2006.01)
*G06N 5/04* (2006.01)
*G06N 7/00* (2006.01)

(52) U.S. Cl.
CPC ......... *G06K 9/6218* (2013.01); *G06K 9/6219* (2013.01); *G06N 3/02* (2013.01); *G06N 5/04* (2013.01); *G06N 7/00* (2013.01)

(56) References Cited

U.S. PATENT DOCUMENTS

2016/0069776 A1* 3/2016 Cai .................... G01M 15/14
  702/35
2018/0219889 A1* 8/2018 Oliner .................... G06N 3/04
2018/0300737 A1* 10/2018 Bledsoe ................ G06F 16/248

OTHER PUBLICATIONS

Mahkya, D.A. et al. (2017). "Hierarchical time series bottom-up approach for forecast the export value in Central Java," *IOP Conf. Series: Journal of Physics: Conf. Series*, vol. 893; pp. 1-8.
Sanwlani, M. et al. (2013). "Forecasting Sales Through Time Series Clustering," *International Journal of Data Mining & Knowledge Management Process (IJDKP)*, vol. 3, No. 1; pp. 39-56.

* cited by examiner

| TS | Time series Data |
|----|------------------|
| 1  | 99.8 109.4 116.6 116.2 100.7 103.8 104.5 115.1 111.1 107.7 112.1 108.9 94.6 118.5 |
| 2  | 84.7 81.9 97.4 97.4 89.4 80.8 76.7 90.6 90.3 81.7 81.7 73.9 73.2 81 |
| 3  | 79.8 77.5 91.9 85.6 89.8 85.2 79.4 89.7 85.4 77.2 70.8 64.9 67.3 75.5 |
| 4  | 97.2 88.3 108.5 100 53.1 45.7 51.7 74.7 108.4 96.2 93.1 97.5 91.3 100.4 |
| 5  | 131.3 146.2 204.2 170.4 167.1 114.5 93.7 113.5 142.8 104.7 148.5 131.4 111 136.5 |
| 6  | 104.1 116.6 120.4 118.5 100.2 103 106.7 117.9 115.6 113.6 120.4 117.8 99.5 125.7 |
| 7  | 96.2 94.9 100.1 98.9 92.9 93.2 87.1 94.8 97.9 95.7 97.1 98 93.9 97.7 |
| 8  | 114.2 91.9 89.6 94.5 110.3 77.7 78.3 96.2 107.5 110.2 119.4 121.6 105.9 100.7 |
| 9  | 89.2 109.5 111.2 106.9 82.6 103.8 105.9 115.8 114.7 114.6 116.8 108.7 85.4 112.6 |
| 10 | 74.5 84.3 91.1 100.2 80.6 88.1 82.1 74.1 81.3 73.2 85.1 80.7 71.8 84 |
| 11 | 81.8 99 92.4 98.2 69.3 96.1 96.6 113.6 97.4 97 105.8 109 68.4 116.9 |
| 12 | 98.3 106.9 109 104.8 81 84.6 87.3 99.1 103.9 98 97.2 96.4 91.3 107.3 |
| 13 | 102.4 106.8 107.8 108.5 85.3 112.3 103.7 106.6 110.6 110.2 109.1 113.3 106.9 115.1 |
| 14 | 94 104.4 114.2 111 93 78.6 84.2 92.7 97 89.8 86.5 79 87 103.6 |
| 15 | 101.3 75.3 72.3 94.1 92.6 89.5 84.2 94.1 96.3 103.7 97.7 110.1 107.9 95.9 |
| 16 | 88.5 95.1 104.5 104.8 89.5 103.7 106.1 109.3 108.4 105.4 109.1 109.3 99.7 111.9 |
| 17 | 83.4 112.9 112.4 110.5 93.8 95.5 116.4 110.2 104.6 87.1 104.4 88.7 81 104.3 |
| 18 | 104.4 119.2 122.4 105.7 81.6 106.1 112.4 117.1 117.8 119.6 123.6 122 99.1 125.6 |
| 19 | 109.6 114.3 122.3 105.6 68.3 75.9 82.7 100.3 106.5 110.2 108.8 113.4 103.3 116.8 |
| 20 | 87.1 99.8 101.7 101.9 70 104.9 95.8 105.4 99.5 99.3 103.8 98.4 84.9 102.9 |

FIG. 2A

| TS | Time series Data |
|----|------------------|
| 21 | 104.8 118.6 125.5 117.9 92.4 104.7 103.9 118.3 115.2 113.5 120.1 116 104.4 125 |
| 22 | 82.4 102.7 103.9 94.6 98.4 91.9 107.3 113 101.8 97.1 112.9 101.4 92.9 120.2 |
| 23 | 117.5 142.2 137.6 130.1 108.5 117.7 122.4 133.6 130.2 125.8 139 134.1 115.9 149.4 |
| 24 | 103.6 115.2 125.7 129 122.9 98.3 104.9 125.1 120 123.9 124.9 119.2 98.8 124.2 |
| 25 | 112.7 134.2 133.3 142.5 100.3 130.2 135.3 144.7 136.8 127.8 141.3 141.5 97.7 149.9 |
| 26 | 121.4 129 129.6 157.8 191.4 91.4 117 137.7 131.8 133.6 154.8 123.2 121.4 149.2 |
| 27 | 101.8 112 116.6 118.2 99.6 97.9 99.8 112.8 105.6 103.8 111.6 107.7 104.8 120.1 |
| 28 | 111.8 129.3 132.1 131.3 105.1 109.9 104.9 118.8 121.2 119.3 125.3 118 105 135.1 |
| 29 | 106.2 113.3 128.3 117.3 167.1 68.1 82.1 99 91.1 99.4 106.8 110.8 96.3 137.1 |
| 30 | 81.2 79.3 102.2 109.5 107.1 115.2 101.5 107.6 93.8 84.2 76.9 71.7 75.1 91.1 |
| 31 | 81.2 79.3 102.2 109.5 107.1 115.2 101.5 107.6 93.8 84.2 76.9 71.7 75.1 91.1 |
| 32 | 108.5 124.7 129 133.4 119.2 108.4 116 130 123 120.9 131.1 127.7 100 138.8 |
| 33 | 99.5 114.1 118.6 119.3 95.9 108.2 104.9 114.8 109.8 105.1 110.9 100.6 100.2 119.1 |
| 34 | 102.9 115.5 119.4 111.9 85.6 102.1 104.1 114.2 114.6 113.1 117.7 116.3 101 121.9 |
| 35 | 97.2 99.8 103.3 102.4 92.9 88.3 88.6 97.1 100.1 96.9 103.2 98.7 92.9 103.5 |
| 36 | 81.7 79.2 99.7 104.6 103.6 108.9 97 104 92.5 83.7 76.5 71.7 74.7 88.4 |
| 37 | 81.7 0 99.7 104.6 0 108.9 97 104 0 83.7 0 0 74.7 88.4 |
| 38 | 81.7 0 0 104.6 0 0 97 104 0 83.7 0 0 74.7 88.4 |
| 39 | 121.4 0 0 0 191.4 91.4 117 137.7 0 0 0 123.2 121.4 149.2 |

FIG. 2B

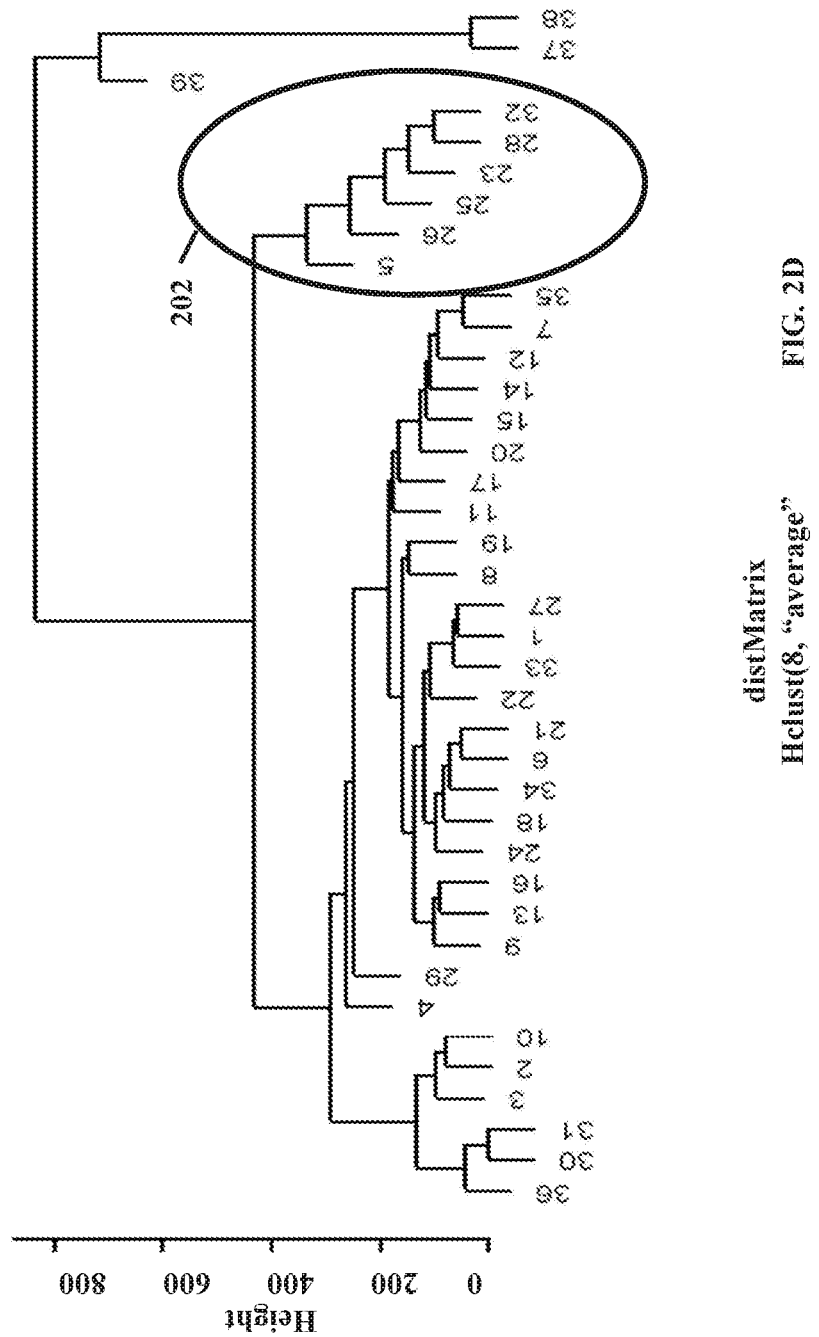

METHOD AND SYSTEM FOR MODEL FITTING TO HIERARCHICAL TIME SERIES CLUSTER

CROSS-REFERENCE TO RELATED APPLICATIONS AND PRIORITY

This application takes priority from the Indian filed application no. 201721028534 filed on 10 Aug. 2017 the entirety of which is hereby incorporated by reference.

DESCRIPTION

Technical Field

The embodiments herein generally relate to time series clusters and, more particularly, to model building for hierarchical time series clusters.

Background

Time series forecasting is crucial in deriving future insights and planning for many application areas such as energy, sales in retail and its supply chain and traffic management and the like. A huge volume of time series data is gathered from multiple source points to derive future insights for a specific application domain by generating forecasts.

Processes of model fitting or model building for time series provides fits provide for fitting a suitable model to the time series, which enables generating forecasts based on the acquired time series data. Conventional methods individually fit a model to each time series (out of models from a model repository). A model is identified as the best possible fit for the time series, hence provides higher forecast accuracy. However, for multitude of applications, where the time series data gathered is large in numbers, the conventional methods of individual model fitting are not time efficient. It is observed that applications areas from multiple domains gather millions of time series data that can be organized as time series clusters. Many existing methods try to utilize cluster characteristics for model building for the time series. An existing method focuses on time series clustering and forecasting, where initially each individual time series is split into multiple components. Further, the multiple components of time series are clustered and a forecast expert or a model for each cluster is identified. All the forecast experts for each component cluster are then aggregated to identify a forecast expert or model for the time series being analyzed. This existing approach thus multiplies with the number of each time series to be processed generating additional volume of time series data. Multiple domains and typical applications areas, for example, retail industries and its supply chain, gather millions of time series data that can be organized as hierarchical time series clusters. Each time series within the hierarchical time series cluster has its individual characteristics that varies in accordance with the hierarchical level where the time series lies in the hierarchical time series cluster. Some existing approaches provide insights on model fitting to hierarchical time series where a global or single model is identified for the hierarchical time series that is then used in forecasting of the hierarchical time series. However, the single model approach to the hierarchical time series provides a generalized or common model for all the time series within the hierarchical time series. Thus, the existing method tries to generalize all the time series of the cluster and may lose individual characteristics of each time series, which effectively reduces accuracy of rightly capturing each time series with its individual characteristics. However, a good balance needs to be sought between identifying best fit model for each time series and identifying common best fit models for plurality of series so as to achieve good time efficiency during model fitting along with good forecast accuracy.

SUMMARY

Embodiments of the present disclosure present technological improvements as solutions to one or more of the above-mentioned technical problems recognized by the inventors in conventional systems.

In an aspect, there is provided a processor implemented method for model building, interchangeably referred to as model fitting, for time series clusters. The method comprises clustering a plurality of time series into hierarchical time series clusters based on Dynamic Time Warping (DTW) distance measure. Further, for each branch of the hierarchical time series clusters, the method performs following steps comprising: identifying a first time series, among the plurality of time series, placed at a cluster height equal to a lowest cluster height of a branch of the hierarchical time series clusters; determining a best fit model, from a plurality of time series models, for the first time series that provides an error below an Error Tolerance (ET) threshold. Further, the method comprises determining the best fit model, from the plurality of time series models, for a second time series placed at a cluster height equal to the cluster height of the first time series. The best fit model for the second time series is the best fit model determined for the first time series if the error, when the first best fit model is applied to the second time series, is below the ET threshold. Also, the model for the second time series is retained if the error, when the first best fit model is applied to the second time series, is above the ET and an error difference (ED) between the error for the first time series and the error for the second time series is below an Error Difference (ED) threshold. However, a next best fit model is selected if the ED is above the ED threshold. The next best fit model provides the error below the ET threshold and is selected from remaining models among the plurality of time series models excluding the determined best fit model for the first time series. Further, the method comprises determining the best fit models for the plurality of time series placed at successive higher cluster heights of the branch by iterating steps of determining of the best fit model for the first time series and the second time series.

In another aspect, there is provided a system comprising: one or more data storage devices operatively coupled to the one or more processors and configured to store instructions configured for execution by the one or more processors to cluster a plurality of time series into hierarchical time series clusters based on Dynamic Time Warping (DTW) distance measure. Further, for each branch of the hierarchical time series clusters, the processor is configured to perform following steps comprising: identifying a first time, from the plurality of time series, series placed at a cluster height equal to a lowest cluster height of a branch of the hierarchical time series clusters; determining a best fit model, from a plurality of time series models, for the first time series that provides an error below an Error Tolerance (ET) threshold. Further, the processor is configured to determining the best fit model, from the plurality of time series models, for a second time series placed at a cluster height equal to the cluster height of the first time series. The best fit model for the second time series is the best fit model determined for the first time series if the error, when the first best fit model is applied to the second time series, is below the ET threshold. Also, the model for the second time series is retained if the error, when the first best fit model is applied to the second time series, is above the ET and an error difference (ED) between the error for the first time series and the error for the second time series is below an Error Difference (ED) threshold. However, a next best fit model is selected if the ED is above the ED threshold. The next best fit model provides the error below the ET threshold and is selected from remaining models among the plurality of time series models excluding the determined best fit model for the first time series. Further, the processor is configured to determine the best fit models for the plurality of time series placed at successive higher cluster heights of the branch by iterating steps of determining of the best fit model for the first time series and the second time series.

In yet another aspect, there is provided a computer program product comprising a non-transitory computer readable medium having a computer readable program embodied therein, wherein the computer readable program, when executed on a computing device, causes the computing device to cluster a plurality of time series into hierarchical time series clusters based on Dynamic Time Warping (DTW) distance measure. Further, for each branch of the hierarchical time series clusters, the computer device performs following steps comprising: identifying a first time series, from a plurality of time series, placed at a cluster height equal to a lowest cluster height of a branch of the hierarchical time series clusters; determining a best fit model, from a plurality of time series models, for the first time series that provides an error below an Error Tolerance (ET) threshold. Further, the computer device determines the best fit model, from the plurality of time series models, for a second time series placed at a cluster height equal to the cluster height of the first time series. The best fit model for the second time series is the best fit model determined for the first time series if the error, when the first best fit model is applied to the second time series, is below the ET threshold. Also, the model for the second time series is retained if the error, when the first best fit model is applied to the second time series, is above the ET and an error difference (ED) between the error for the first time series and the error for the second time series is below an Error Difference (ED) threshold. However, a next best fit model is selected if the ED is above the ED threshold. The next best fit model provides the error below the ET threshold and is selected from remaining models among the plurality of time series models excluding the determined best fit model for the first time series. Further, the computer device is configured to determine the best fit models for the plurality of time series placed at successive higher cluster heights of the branch by iterating steps of determining of the best fit model for the first time series and the second time series.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIGS. 2A, 2B, 2C, and 2D illustrate an example for hierarchical clustering of a plurality of time series into hierarchical time series clusters, in accordance with an embodiment of the present disclosure.

DETAILED DESCRIPTION OF EMBODIMENTS

Figure 1:
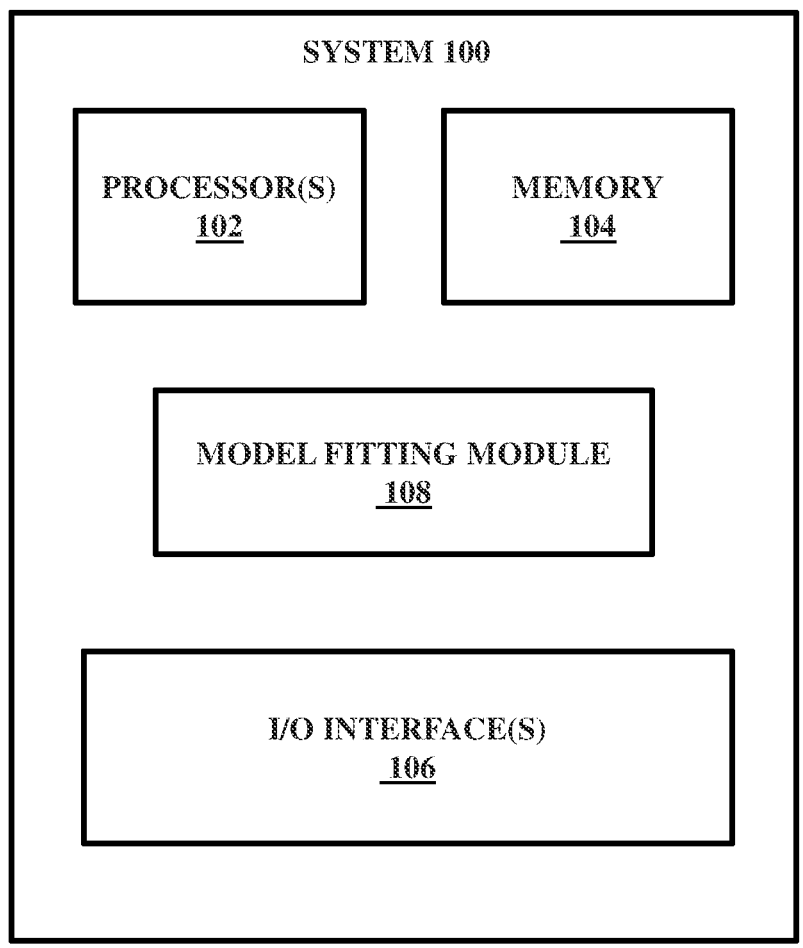
FIG. 1 illustrates a system for model building (model fitting) for hierarchical time series clusters, in accordance with an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The embodiments herein provide a method and system for model fitting to hierarchical time series clusters. A plurality of time series to be analyzed are clustered as hierarchical time series clusters using Dynamic Time Warping (DTW) as optimal distance measure to create time series hierarchical clusters. The method disclosed recognizes least dissimilarity time series in the hierarchical time series clusters, a best fit model is identified for the time series and the same model is continued up the hierarchy along the branch of the hierarchical time series clusters till the model identified satisfies Error Tolerance (ET) and Error Difference (ED) criteria. The method reduces the model fitting time, also referred to as model building time by more than 50%. The same is explained with an example while describing the method flow. The time efficiency obtained in model fitting of time series is critical while processing millions of time series. Thus higher the time efficiency, the faster the forecasting of the time series to get insights from the data gathered.

Referring now to the drawings, and more particularly to FIG. 1 through FIG. 4 where similar reference characters denote corresponding features consistently throughout the figures, there are shown preferred embodiments and these embodiments are described in the context of the following exemplary system and/or method.

FIG. 1 illustrates a system for model building for hierarchical time series clusters, in accordance with an embodiment of the present disclosure. In an embodiment, the system 100 includes one or more processors 102, communication interface device(s) or input/output (I/O) interface(s) 106, and one or more data storage devices or memory 104 operatively coupled to the one or more processors 102. The one or more processors 102 that are hardware processors can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In the context of the present disclosure, the expressions 'processors' and 'hardware processors' may be used interchangeably. In an embodiment, the system 100 can be implemented in a variety of computing systems, such as laptop computers, notebooks, hand-held devices, workstations, mainframe computers, servers, a network cloud and the like.

The I/O interface (s) 106 may include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface(s) can include one or more ports for connecting a number of devices to one another or to another server.

The memory 104 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (such as a model fitting module 108) of the system 100 can be stored in the memory 104.

Figure 2C:
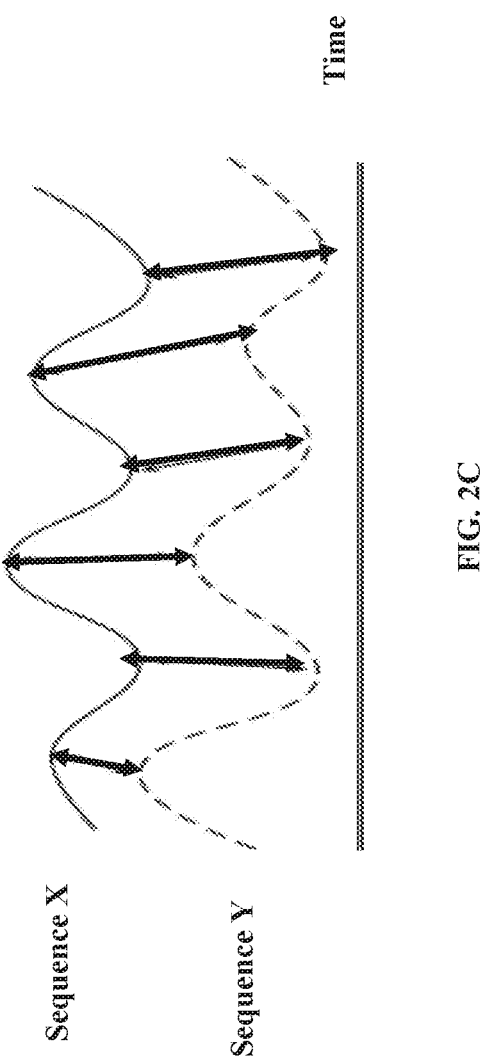
Figure 3A:
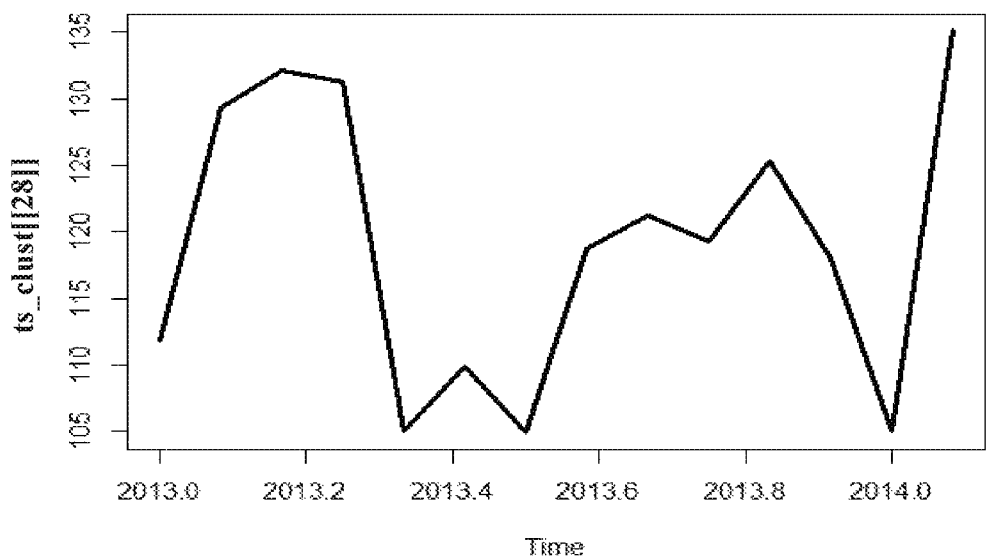
FIGS. 3A, 3B, 3C, 3D, 3E, and 3F illustrate plots of a few example time series from the hierarchical time series clusters, in accordance with an embodiment of the present disclosure.
Figure 3B:
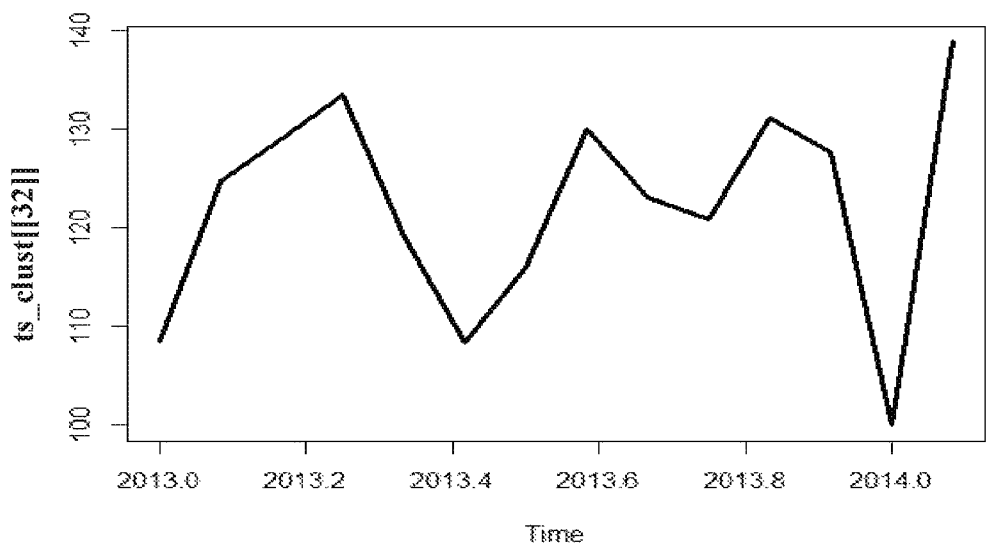
Figure 3C:
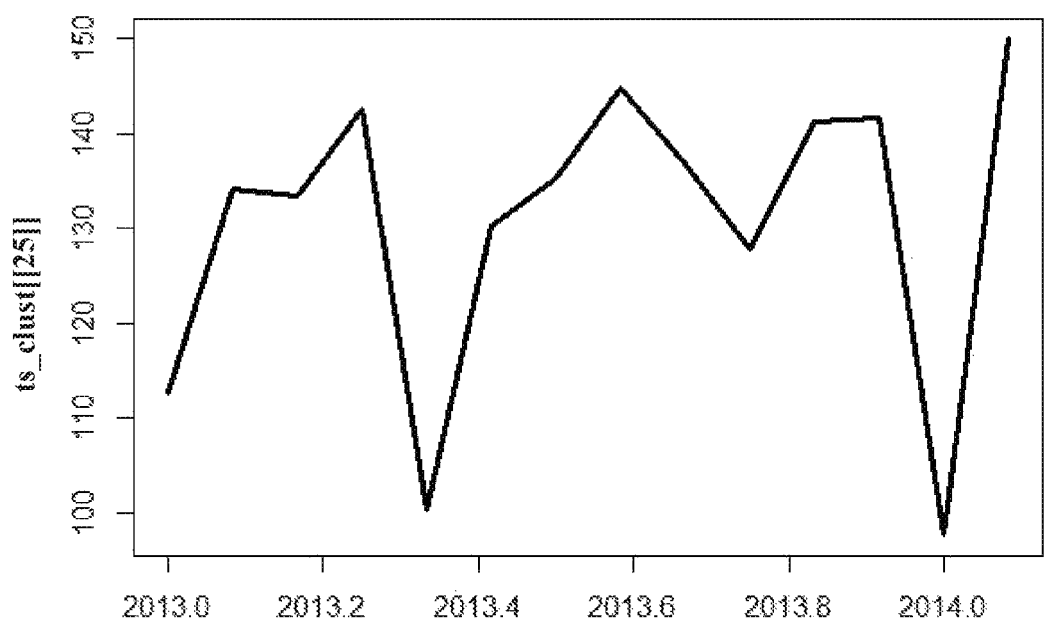
Figure 3D:
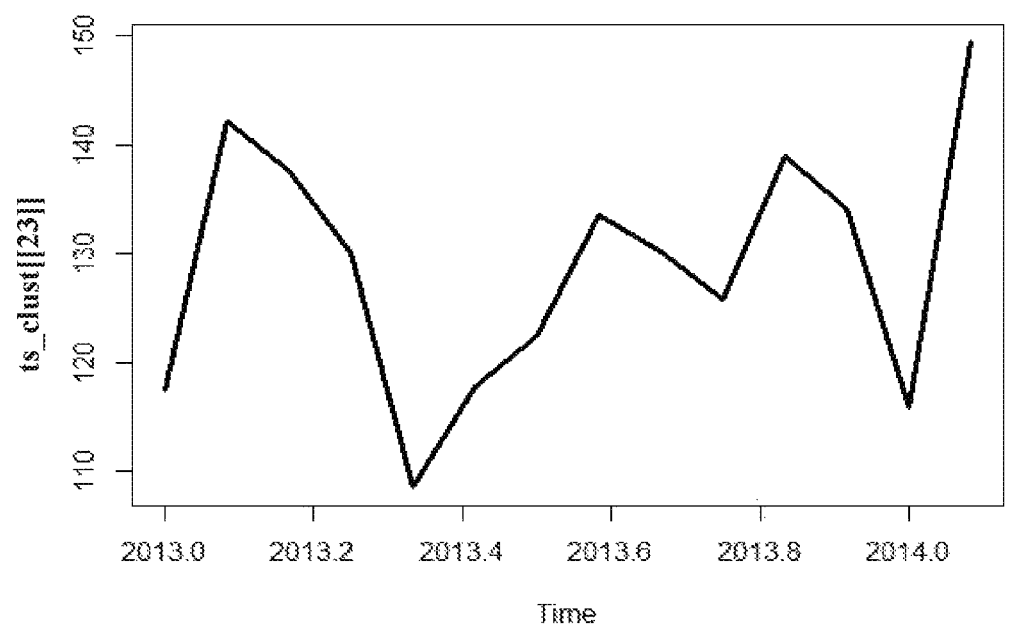
Figure 3E:
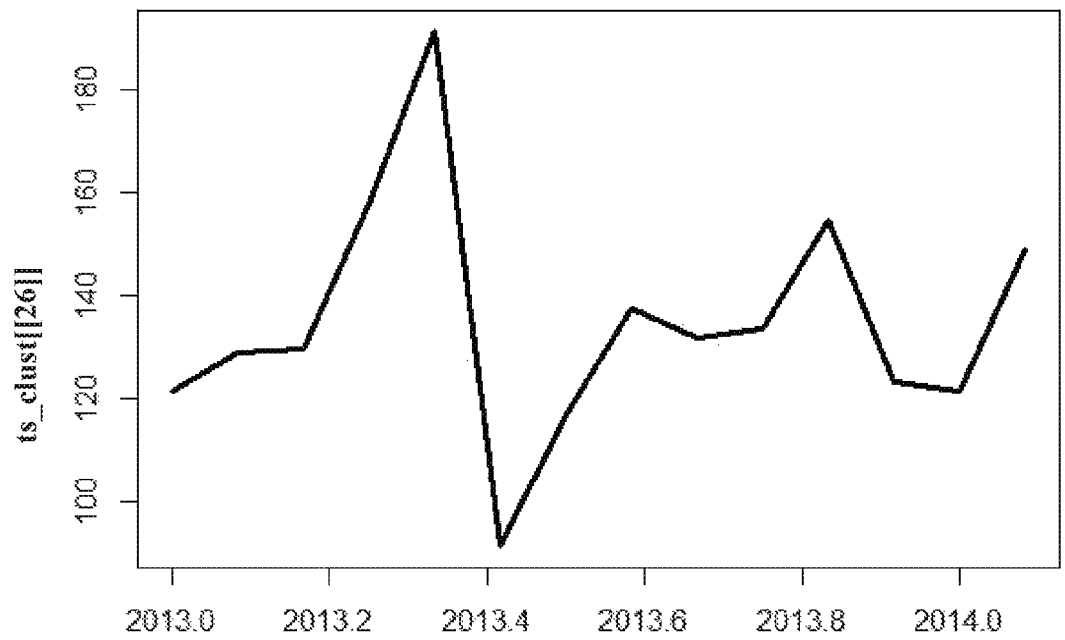
Figure 3F:
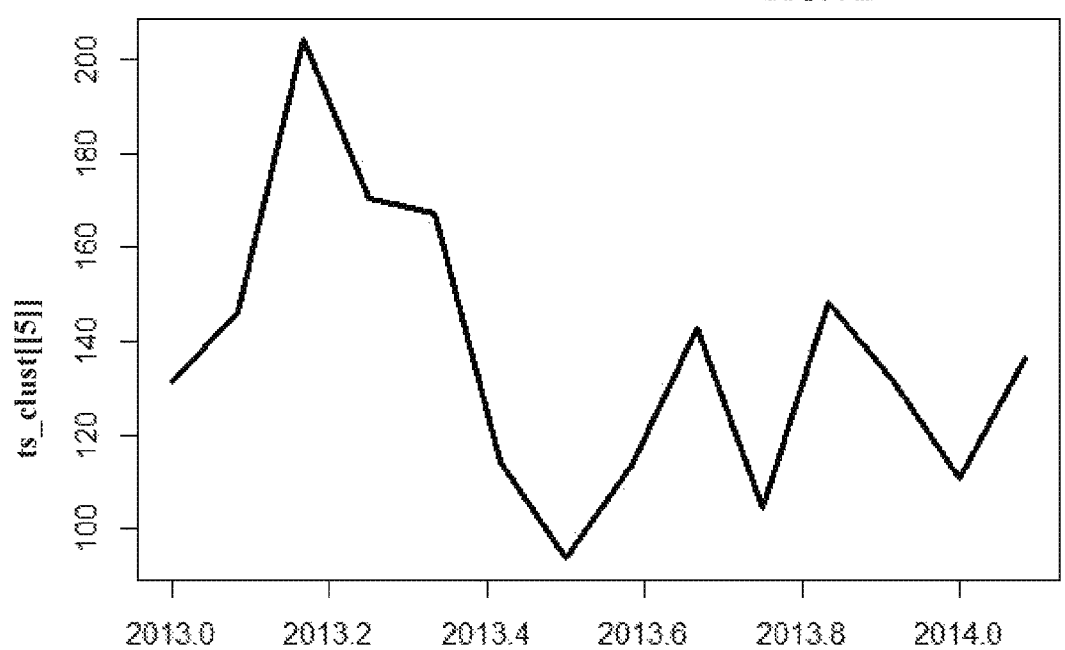

FIG. 2A through FIG. 2D illustrate an example for hierarchical clustering of a plurality of time series into hierarchical time series clusters, in accordance with an embodiment of the present disclosure. Time series clustering is to partition the plurality of time series (time series data) into different groups based on similarity or distance, such that time series or TS in the same cluster are more similar. One of the key component in TS clustering is the function used to measure the similarity between two time series being compared. Practically, the time series data captured could be in various forms including raw values of equal or unequal length, vectors of feature-value pairs, transition matrices, and so on. Thus, to cluster the time series, the DTW distance is utilized for generating hierarchical time series clusters. FIG. 2A and FIG. 2B depicts data set for the plurality of time series. The time series is generated from the data set and then a DTW distance matrix is calculated using DTW technique. The DTW technique enables measuring similarity between two temporal sequences (time series data) which may vary in time or speed. For instance, similarities in walking patterns can be detected using DTW, even if one person walks faster than the other, or if there is any accelerations and deceleration during the course of an observation. DTW allows for non-linear alignments between time series not necessarily of the same length, as shown in FIG. 2C. In general, DTW is an approach that calculates an optimal match between two given (time dependent) sequences under certain restrictions.

Intuitively, the sequences are warped in a nonlinear fashion to match each other. The method disclosed applies DTW to automatically cope with time deformations and different speeds associated with time-dependent data. Given two time series, $Q=q_1, q_2, \ldots, q_i, \ldots, q_n$ and $R=r_1, r_2, \ldots, r_j, \ldots, r_m$, the DTW aligns the two time series so that their difference is minimized. Further, an n×m matrix where the (i, j) element of the matrix contains the distance $d(q_i, r_j)$ between two points $q_i$ and $r_j$. A Euclidean distance is normally used. A warping path, $W=w_1, w_2, \ldots, w_k, \ldots, w_K$ where max(m, n) less or equal to (K) less or equal to (m+n−1), is a set of matrix elements that satisfies three constraints: boundary condition, continuity, and monotonically. The boundary condition constraint requires the warping path to start and finish in diagonally opposite corner cells of the matrix. The DTW technique computes the time axis stretch which optimally maps one time series onto another and outputs the remaining cumulative distance between the two time series being compared. That is w1=(1, 1) and wK=(m, n). The continuity constraint restricts the allowable steps to adjacent cells. The monotonicity constraint forces the points in the warping path to be monotonically spaced in time. The warping path that has the minimum distance between the two series, is of interest.

The FIG. 2D, depicts a cluster dendogram with a plurality of branches (clusters) of the hierarchical time series clusters generated for the example time series data of the FIG. 2A and the FIG. 2B clustered using a DTW distance. Vertical axis of the cluster dendogram of the FIG. 2D represents cluster height, which is a measure of dissimilarity between the pluralities of time series of each branch of the hierarchical time series clusters. As observed from FIG. 2D and from the example time series plots depicted in FIGS. 3A through 3F, many clusters are formed using the DTW distance. The DTW distance can be provided as input for model fitting approach disclosed by the method. For instance, a cluster or a branch 202 of the hierarchical time series clusters depicted in the FIG. 2D includes 6 time series. The time series 32 (TS 32) and TS 28 (the bottom most series of the cluster) has lowest level of dissimilarity, as depicted in the FIG. 3A and FIG. 3B. Further, as the cluster is traversed upward, the cluster height increases and the dissimilarity level increases. Similarly, FIG. 3C, 3D and FIG. 3E, 3F depicts time series plot for TS 23, TS 25, TS 26 and TS 5.

Figure 4:
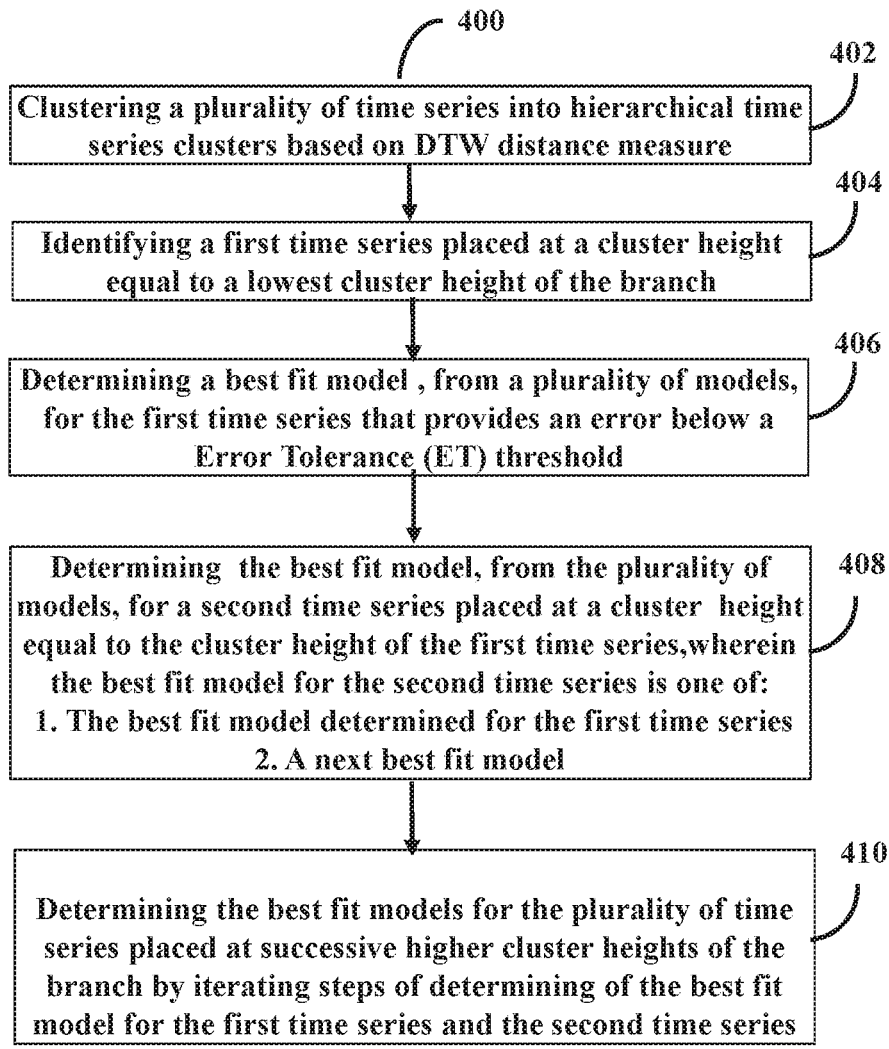
FIG. 4 illustrate exemplary flow diagrams for a processor implemented method for model building for the hierarchical time series clusters, in accordance with an embodiment of the present disclosure.

FIG. 4 illustrate exemplary flow diagrams for a processor implemented method for model fitting to hierarchical time series clusters, in accordance with an embodiment of the present disclosure. In an embodiment, the system 100 includes one or more data storage devices or memory 104 operatively coupled to the one or more processors 102 and is configured to store instructions configured for execution of steps of the method 400 by the one or more processors 104. The steps of the method 400 will now be explained in detail with reference to the components of the system 100 of FIG. 1. Although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

In an embodiment, of the present disclosure, at step 402, the one or more processors 102 in conjunction with the model fitting module 108 are configured to clustering the plurality of time series into hierarchical time series clusters based on the DTW distance measure. For each branch of the hierarchical time series clusters, at step 404, the one or more processors 102 in conjunction with the model fitting module 108 are configured to identify a first time series among the plurality of time series placed at a cluster height equal to a lowest cluster height of the branch or cluster of the hierarchical time series clusters. At step 406, the one or more processors 102 in conjunction with the model fitting module 108 are configured to determine a best fit model, from a plurality of time series models, for the first time series that provides an error below an Error Tolerance (ET) threshold.

Fitting model to the selected time series can be performed using available model fitting techniques defined for the plurality of time series models in the repository. The plurality of time series models can be selected and stored in a repository, for example in the memory 104. For example, the models for the time series that are evaluated include Holt-winters, AutoRegressive Integrated Moving Average (ARIMA), Seasonal Trend Loess (STL), and Error Trend Seasonality (ETS), Neural Network model, Moving Average (MA) and the like. The ET threshold and ED threshold are user defined values, for example, can be set to 10% to 15% that may be derived from user experience gained by analyzing model fitting process for time series. Also the measure used for error is defined by the user, for example herein the error measure is MAPE. The ED, for example, utilizes Intra Cluster Error Difference (ICED) as a measure of error difference. At step 408, the one or more processors 102 in conjunction with the model fitting module 108 are configured to determine the best fit model, from the plurality of time series models in the repository, for a second time series, The second time series corresponds to a time series placed at a cluster height equal to the cluster height of the first time series.

In a scenario, the best fit model determined for the first time series is selected as the model for the second time series if the error when the first best fit model is applied to the second time series is below the ET threshold. Also, in another scenario, if the error, when the first best fit model is applied to the second time series, is above the ET but the ED between the error for the first time series and the error for the second time series is below an Error Difference (ED) threshold then the best fit model determined for the first time series is applied to the second time series. However, if the ED is above the ED threshold, then a next best fit model is identified. The next best fit model is selected such that it provides the error below the ET threshold. The next best fit model is selected from remaining models excluding the determined best fit model for the selected time series (first time series). In an embodiment, the next best fit model is 'next in sequence model' in repository that satisfies the ET threshold. Thus, the remaining models in the repository are checked, with the method steps for model selection iterating till a model, satisfying the ET threshold is not encountered. In an embodiment, the best fit model from remaining models is one selected by applying all models and identifying model with least error.

At step 410, the one or more processors 102 in conjunction with the model fitting module 108 are configured to determine the best fit models for the plurality of time series placed at successive higher cluster heights of the branch. This is performed by iterating steps of determining of the best fit model for the first time series and the second time series at every cluster height of the branch.

The method 400 is explained below in conjunction with the cluster dendogram of FIG. 2D.
1. The method 400 determines the optimal distance matrix of the TS of the FIG. 2A and the FIG. 2B using DTW.
2 DTW distance to create hierarchical clustering is taken from user input.
3. User defined values are taken for Error Tolerance-ET threshold, Error Measure-EM for example mean absolute percentage error (MAPE), ED technique to be used such as Intra Cluster Error Difference-ICED and the ED threshold value.
4. Further, m different TSs at lowest level (lowest cluster height) are identified as seen in FIG. 2D depicting the cluster dendogram (for example herein TS-28, TS-32, TS23, TS 25, TS26 and TS5 belong to one cluster, in which TS-28 and TS-32 are most similar ones.
5. A time series model (best fit model) is fit to TS-28 (first time series) and the error is determined (say the model, in this case is Holt Winter, with Error Measure selected by user is MAPE and the Error is determined).
6. If Error←Error Tolerance (ET) threshold, fit that model to TS-32 (second time series) as well. If not select other model from the repository and ensure the ET threshold is satisfied.
7. If Error is not within ET for TS-32 (say Error is 30 for TS-28 and Error is 31 for TS-32. But user provided ET is 30. Then find out the difference of the error measure (or percentage difference of error—say intra cluster error difference-ICED) between TS 28 and TS 32.
8. If ICED is within the permissible limit (as provided by the user), use the same model (best fit model) of (TS 28) to TS 30.
9. If not, iterate to identify the best fit model (next best fit model) from the remaining time series models. In an embodiment, the best fit model (next best fit) is the next in sequence model in repository that satisfies the ET threshold. In an embodiment, the best fit model (next best fit) from remaining models is one selected by applying all models and identifying model with least error.

Time optimization achieved by the method proposed is explained with help of an example:

Assumption: Number of clusters or number of branches: n with each cluster having 'p' time series (TSs). The repository has 'k' TS models with average time to fit the model for one TS=0.8 min.

Overall time taken for model fitting in traditional way is as below:

The total time to fit the model to all time series=No of TS * average time to fit one model*No of models=100*0.8*5=400 min Overall time taken for model fitting in our approach For each cluster, x % of TSs require model fitting.

For one cluster, for first TS (TS at lowest level or lowest cluster height) all models are evaluated. Time taken=0.8*5=4 mins As per assumption, 40% of the TSs require model evaluation as the error may be above the ET threshold and the ED is above ED threshold. So time required for model fitting=0.4*20*4=32 min and the evaluated models are fitted to the rest of the TS. Thus for 5 clusters or 5 branches total time required=5*32=160 mins Saving in the time compared to traditional approach=(400−160)/400=60%

The method reduces the model fitting time, also referred as model building time by more than 50%. The same is explained with an example while describing the method flow. The time efficiency obtained in model fitting of time series is a critical while processing millions of time series. Thus higher the time efficiency faster is the forecasting of the time series to get insights from the data gathered.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method for model fitting a plurality of time series, the method comprising:
   optimizing model fitting time of the plurality of time series, wherein the plurality of time series comprises millions of time series to be processed from multiple domains, wherein the model fitting time is optimized by:
      clustering the plurality of time series into the hierarchical time series clusters (402) based on Dynamic Time Warping (DTW) distance measure:
      for each branch of the hierarchical time series clusters, performing steps of:
         identifying a first time series, from the plurality of time series, placed at a cluster height equal to a lowest cluster height of a branch of the hierarchical time series clusters (404);
         determining a best fit model, from a plurality of time series models, for the first time series, wherein the determined best fit model provides an error below an Error Tolerance (ET) threshold (406);
         determining a second best fit model, from the plurality of time series models, for a second time series, wherein the second time series is placed at a second cluster height equal to the cluster height of the first time series (408), wherein the second best fit model for the second time series is the best fit model determined for the first time series if:
         a second error, when the best fit model is applied to the second time series, is below the ET threshold; or
         the second error, when the best fit model is applied to the second time series, is above the ET threshold and an error difference (ED) between the error for the first time series and the second error for the second time series is below an Error Difference (ED) threshold,
            wherein the second best fit model for the second time series is a next best fit model determined, if the ED is above the ED threshold, and wherein the next best fit model provides the second error below the ET threshold and is selected from remaining time series models among the plurality of time series models excluding the determined best fit model for the first time series; and
         determining best fit models for the plurality of time series placed at successive higher cluster heights of the branch by iterating steps of determining of the best fit model for the first time series and determining the second best fit model for the second time series (410).

2. The processor implemented method of claim 1, wherein the ET threshold and ED threshold are user defined values.

3. The processor implemented method of claim 1, wherein the ED utilizes Intra Cluster Error Difference (ICED) as a measure of error difference.

4. The processor implemented method of claim 1, wherein the plurality of time series models comprise a Holt-winters, an AutoRegressive Integrated Moving Average (ARIMA), an Seasonal Trend Loess (STL), an Error Trend Seasonality (ETS) and Neural Network model, Moving Average (MA).

5. The processor implemented method of claim 1, wherein the cluster height is a measure of dissimilarity between two time series of a given branch of the hierarchical time series clusters.

6. A system (100) for model fitting a plurality of time series, the system (100) comprising one or more data storage devices (104) operatively coupled to one or more processors (102) and configured to store instructions configured for execution by the one or more processors to:

optimize model fitting time of the plurality of time series, wherein the plurality of time series comprises millions of time series to be processed from multiple domains, wherein the model fitting time is optimized by:

clustering the plurality of time series into the hierarchical time series clusters based on Dynamic Time Warping (DTW) distance measure:

for each branch of the hierarchical time series clusters:

identifying a first time series, from a plurality of time series, placed at a cluster height equal to a lowest cluster height of a branch of the hierarchical time series clusters;

determining a best fit model, from a plurality of time series-models, wherein the determined best fit model for the first time series provides an error below an Error Tolerance (ET) threshold;

determining a second best fit model, from the plurality of time series models, for a second time series placed at a second cluster height equal to the cluster height of the first time series, wherein the second best fit model for the second time series is the best fit model determined for the first time series if:

a second error, when the best fit model is applied to the second time series, is below the ET threshold; or the second error, when the first best fit model is applied to the second time series, is above the ET threshold and an error difference (ED) between the error for the first time series and the second error for the second time series is below an Error Difference (ED) threshold, wherein the second best fit model for the second time series is a next best fit model determined, if the ED is above the ED threshold, and wherein the next best fit model provides the second error below the ET threshold and is selected from remaining time series models among the plurality of time series models excluding the determined best fit model for the first time series; and determining best fit models for the plurality of time series placed at successive higher cluster heights of the branch by iterating steps of determining of the best fit model for the first time series and determining the second best fit model for the second time series.

7. The system (100) of claim 6, wherein the ET threshold and ED threshold are user defined values.

8. The system (100) of claim 6, wherein the ED utilizes Intra Cluster Error Difference (ICED) as a measure of error difference.

9. The system (100) of claim 6, wherein the plurality of time series models comprise a Holt-winters, an AutoRegressive Integrated Moving Average (ARIMA), an Seasonal Trend Loess (STL), an Error Trend Seasonality (ETS) and Neural Network model, Moving Average (MA).

10. The system (100) of claim 6, wherein the cluster height is a measure of dissimilarity between the pluralities of time series at each of the branch of the hierarchical time series clusters.

11. A computer program product comprising a non-transitory computer readable medium having a computer readable program embodied therein, wherein the computer readable program, when executed on a computing device, causes the computing device to:

optimize model fitting time of a plurality of time series, wherein the plurality of time series comprises millions of time series to be processed from multiple domains, wherein the model fitting time is optimized by:

clustering the plurality of time series into the hierarchical time series clusters based on Dynamic Time Warping (DTW) distance measure;

for each branch of the hierarchical time series clusters, performing steps of:

identifying a first time series, from the plurality of time series, placed at a cluster height equal to a lowest cluster height of a branch of the hierarchical time series clusters;

determining a best fit model, from a plurality of time series models, for the first time series, wherein the determined best fit model provides an error below an Error Tolerance (ET) threshold;

determining a second best fit model, from the plurality of time series models, for a second time series, wherein the second time series is placed at a second cluster height equal to the cluster height of the first time series, wherein the second best fit model for the second time series is the best fit model determined for the first time series if:

a second error, when the best fit model is applied to the second time series, is below the ET threshold; or the second error, when the first best fit model is applied to the second time series, is above the ET threshold and an error difference (ED) between the error for the first time series and the second error for the second time series is below an Error Difference (ED) threshold, wherein the second best fit model for the second time series is a next best fit model determined, if the ED is above the ED threshold, and wherein the next best fit model provides the second error below the ET threshold and is selected from remaining time series models among the plurality of time series models excluding the determined best fit model for the first time series; and determining best fit models for the plurality of time series placed at successive higher cluster heights of the branch by iterating steps of determining of the best fit model for the first time series and determining the second best fit model for the second time series.

12. The computer program product of claim 11, wherein the ET threshold and ED threshold are user defined values.

* * * * *